United States Patent [19]
Wendorff et al.

[11] Patent Number: 5,751,938
[45] Date of Patent: May 12, 1998

[54] PERIPHERAL MODULE AND MICROPROCESSOR SYSTEM

[75] Inventors: Wilhard C. Wendorff, München, Germany; Roland Schwarz, Geneva, Switzerland; Guiseppe Amato, Orio Litta, Italy

[73] Assignee: Motorola, Inc., Schaumburg, Ill.

[21] Appl. No.: 768,765

[22] Filed: Dec. 17, 1996

[30] Foreign Application Priority Data

Jan. 4, 1996 [GB] United Kingdom .................. 9600118

[51] Int. Cl.$^6$ ............................................ G06F 11/00
[52] U.S. Cl. .................... 395/182.08; 395/800.34; 364/187; 701/114
[58] Field of Search ..................... 395/182.08, 290, 395/800.34; 364/187; 701/114

[56] References Cited

U.S. PATENT DOCUMENTS

| | | | |
|---|---|---|---|
| 4,532,594 | 7/1985 | Hosaki et al. | 701/114 |
| 4,748,566 | 5/1988 | Sasaki et al. | 701/114 |
| 4,912,633 | 3/1990 | Schweizer et al. | 395/290 |
| 5,019,980 | 5/1991 | Starr et al. | 701/35 |
| 5,313,104 | 5/1994 | Shibata et al. | 307/10.1 |

FOREIGN PATENT DOCUMENTS

| | | |
|---|---|---|
| 0366361 | 10/1989 | European Pat. Off. . |
| 0408094 | 2/1990 | European Pat. Off. . |

*Primary Examiner*—William M. Treat
*Attorney, Agent, or Firm*—Rennie William Dover

[57] ABSTRACT

A peripheral module includes a peripheral bus arranged for coupling to a number of submodules and an asynchronous interface for coupling the peripheral bus to a main bus of a microprocessor system. A peripheral processor is is programmed with data for managing the activities of the submodules.

3 Claims, 1 Drawing Sheet

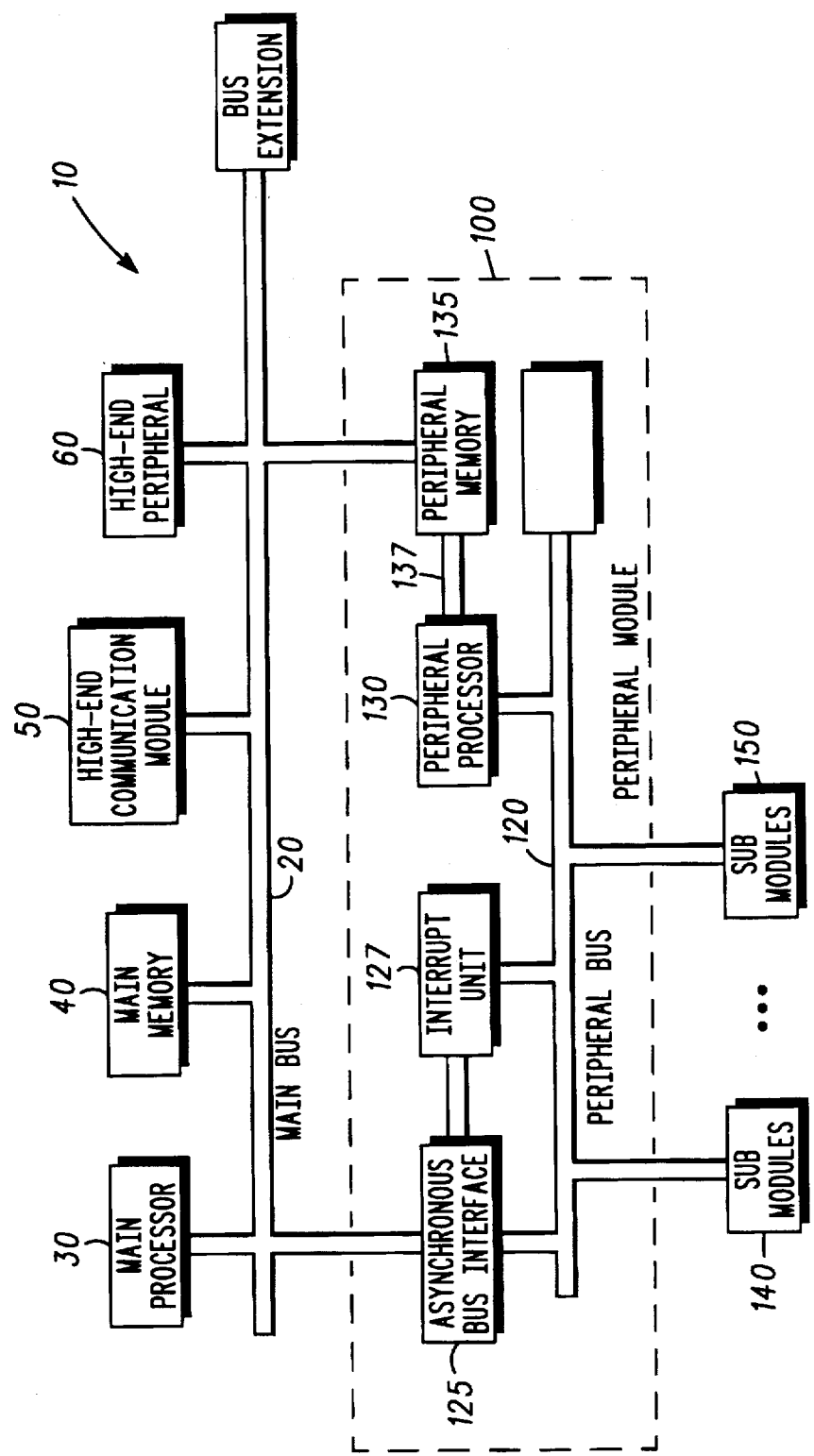

PERIPHERAL MODULE AND MICROPROCESSOR SYSTEM

FIELD OF THE INVENTION

This invention relates to a programmable peripheral module of a microprocessor system.

BACKGROUND OF THE INVENTION

Embedded real time microprocessor systems, such as those associated with automotive applications, require a significant amount of processor performance. Much processing power and speed is required for engine/powertrain control and vehicle control, including ABS (Automatic Braking Systems) and suspension. Intelligent transportation systems (ITS), for example look ahead vehicle crash detection, navigation, and vehicle highway systems, may in the future add to the demands placed on the processor.

High performance microprocessor cores have already been used in such embedded control applications. These high performance microcontroller cores use techniques such as cache, super scalar architecture, pipelined processor units and predicted branches.

These techniques significantly increase the performance of a processor in the case of a highly synchronous program flow. However, performance is significantly reduced if the synchronous program flow is interrupted by asynchronous events, because speculatively executed steps must be reversed and pipelines have to be emptied and refilled.

Furthermore, these high-end microcontroller cores are developed to support dynamic system configurations such as required for a workstation. This leads to a high number of registers. Embedded controllers use only static configurations, but on the other hand require to react quickly to interrupts. The high number of registers slows down the reaction time of a processor core on an external interrupt, because a huge amount of data has to be saved on stacks and the like.

Also, the input data of an automotive embedded controller is 8–12 bits. Pre-processing and even processing of a large amount of data is only 16-bit. Therefore using 32-bit architectures for these types of algorithms increases the program and data memory usage significantly and only partially loads the hardware of the 32-bit architecture.

Many external asynchronous events require only a small amount of processing power to generate a output signal e.g. an angle input initiates data sampling for knock detection. Typical known architectures have little or no interconnects between I/O modules. For knock detection, such as a timer generating an interrupt signal for knock detection data sampling, the microcontroller core serves this interrupt and triggers an A/D converter to sample the data.

Lastly, high-end cores do not particularly support any fail safe concepts. If one redundant module/execution unit fails, no detection or contingency procedure/hardware is implemented within the core. Safety critical embedded real time applications (e.g. ABS, engine management, gear box control, airbag) require a mechanism to detect microcontroller errors and react on these automatically.

Simple solutions are to switch off the controller unit in case of an error, or to provide additional redundant hardware to allow a backup system with reduced functionality to maintain a minimum operation ("limp home" mode) to keep the system running when a failure occurs. This increases the necessity for additional redundant hardware, such as a second redundant microcontroller with all the I/O, protection circuits, clock circuits etc.

This invention seeks to provide a peripheral module which mitigates the above mentioned disadvantages.

SUMMARY OF THE INVENTION

According to a first aspect of the present invention there is provided a peripheral module for use with a microprocessor system, and arranged for coupling to at least one submodule of the system, the module comprising: a peripheral bus arranged for coupling to the at least one submodule; an asynchronous interface for coupling the peripheral bus to a main bus of the microprocessor system; and, peripheral processing means coupled to the peripheral bus, and arranged for managing the activities of the at least one submodule, wherein the peripheral processing means is arranged to be programmed with data for managing the at least one submodule.

According to a second aspect of the present invention there is provided a microprocessor system comprising: a main processor; a main bus, coupled to the main processor; at least one submodule; a peripheral bus arranged for coupling to the at least one submodule; an asynchronous interface for coupling between the peripheral bus and the main bus; and, peripheral processing means coupled to the peripheral bus, and arranged for managing the activities of the at least one submodule, wherein the peripheral processing means is arranged to be programmed with data for managing the at least one submodule.

Preferably the asynchronous interface comprises a dual port memory, having a first port coupled to the peripheral bus and a second port arranged for coupling to the main bus. Preferably the peripheral processing means includes a peripheral processor and memory.

BRIEF DESCRIPTION OF THE DRAWING(s)

An exemplary embodiment of the invention will now be described with reference to the drawing which shows a peripheral module incorporated in a microprocessor system in accordance with the invention.

DETAILED DESCRIPTION OF A PREFERRED EMBODIMENT

Referring to the single figure drawing, there is shown a microprocessor system 10, including a main processor 30, main memory 40, various high-end modules 50, 60, a peripheral module 100, and a main bus 20 coupled to interconnect all of the above.

The peripheral module 100 includes an asynchronous bus interface 125, an interrupt unit 127, a peripheral processor 130, peripheral memory 135 and a number of submodules 140, 150 to be further described below. All of the elements of the peripheral bus are interconnected by a peripheral bus 120.

The asynchronous bus interface 125 is a dual-port memory coupled between the main bus 20 and the peripheral bus 120, allowing asynchronous data transfer between the main bus 20 and the peripheral bus 120.

The asynchronous bus interface 125 is arranged to be asynchronous in order to allow for the different clocks in the main processor 30 and the peripheral processor 130. The asynchronous bus interface 125 is further arranged to allow direct access by the main processor 30 to all submodules 140, 150 connected to the peripheral bus 120.

Each submodule 140, 150 has a peripheral bus interface and can operate as a bus slave, under the management of the peripheral processor 130, when it performs a requested data read or write operation. Alternatively, if bus ownership of the peripheral bus 120 has been granted to the one of the submodules 140, 150, that submodule then acts as a bus master when it initiates data read or data write operations.

To reduce the bus interface overhead, a clock synchronous bus is preferable for the peripheral bus 120. The bus width is 16-bit for data and up to 8/16-bit for addressing. The submodules 140, 150 may be a mixture of 16-bit, 12-bit and 8-bit arrangements, so unaligned data access is the preferred choice. A memory mapped addressing scheme is also preferable. To speed up data transfer, an overlapped Addressing/Data Cycle is favoured. Interrupt mechanisms can be configured allow communication between In/Output modules (possibly through an Interrupt Handling Unit). The level of the submodules 140, 150 should be standardised to allow two, three, or four rows of submodule within the peripheral module 100 connected by one or two bus rows.

The submodules 140, 150 are standard In/Output modules either with internal processing power (queued smart I/O modules) or without. It will be appreciated that the dual processor architecture only requires very simple (dumb) submodules because they share the "processing power" of the peripheral processor 130.

The main hardware needed for the timer are comparator, latches, and link register. These are necessary to guarantee that scheduled events are generated at a very accurate time frame. The link register option will offer the capability to trigger other events already programmed by the peripheral processor.

The peripheral processor 130 has a RISC instruction set. The arithmetical performance should be scaleable during the design phase to serve high performance data pre-processing applications and also standard I/O handling applications, e.g. independent arithmetical unit accessed through a subset of the instruction set. It includes a fast interrupt response scheme e.g. shadow registers, low register count, arithmetical unit that can all be interrupted. Shadow register count should not be too high, because interrupt nesting is in the range of 3-4 for typical embedded data handling routines. The instruction set should be optimised to handle data. It should have a Harvard architecture, with a separate program and data bus. It must support debug features, e.g. back ground debug mode, binary scan. A instruction set similar to the instruction set of the main processor would decrease software development cost in the software partitioning phase (same code, if the routine or part of it is running on the peripheral processor 130 or main processor 30). This would further decrease the required debugging overhead.

The performance of the peripheral processor 130 should be high enough to support failure tolerant functionality. So during design phase this processor must be configured to have e.g. extra power supply (not the same as the main MCU), extra clock circuitry (e.g. backup RC oscillator). This allows to use the peripheral processor as a backup processing device in case of failure of the main processor 30. This enables the very silicon efficient solution of failure backup or detection for safety critical applications e.g. in automotive applications (ABS, engine management, airbag, etc.).

The peripheral memory 135 is connected to the peripheral processor 130 via a direct program bus 137. The peripheral memory is also coupled to the main bus 20, and is arranged for storing data to be used in the management of the submodules 140, 150.

The interrupt unit 127 is coupled to the asynchronous bus interface 125, and provides programmable features to route an interrupt from one of the submodules 140, 150 to one or more of the other submodules 140, 150. This allows a timer to generate periodical interrupt signals triggering several submodules to begin an action such as data sampling, data output etc. The interrupt unit 127 can also handle the synchronisation of events between the main processor 30 and peripheral routines.

The main processor 30 processes the standard processing algorithms using the peripheral processor 130 for data pre-processing. Only a subset of the preprocessing tasks is done redundantly by the main processor 30 to detect errors within the peripheral processor 130. Similarly the peripheral processor also runs a simplified controller algorithm to detect errors within the main processor 30. In case of an error, the faulty processor has to be detected by additional software/hardware (not shown) and the non-faulty processor runs a simplified controller algorithm to keep the system 10 running.

It will be appreciated by a person skilled in the art that alternative embodiments to the one described above are possible. For example, the interrupt unit 127 could be incorporated into the asynchronous bus interface 125.

We claim:

1. A microprocessor system comprising:

a main processor;

a main bus, coupled to the main processor;

at least one submodule;

a peripheral bus arranged for coupling to the at least one submodule;

an asynchronous interface for coupling between the peripheral bus and the main bus; and, peripheral processing means coupled to the peripheral bus, and arranged for managing the activities of the at least one submodule, wherein the peripheral processing means is arranged to be programmed with data for managing the at least one submodule, and further arranged for controlling the microprocessor system should an error occur within the main processor.

2. The peripheral module of claim 1 wherein the asynchronous interface comprises a dual port memory, having a first port coupled to the peripheral bus and a second port arranged for coupling to the main bus.

3. The peripheral module of claim 1 wherein the peripheral processing means includes a peripheral processor and memory.

* * * * *